US009509633B2

United States Patent
Chen

(10) Patent No.: US 9,509,633 B2
(45) Date of Patent: Nov. 29, 2016

(54) MULTI-SWITCHING DEVICE AND MULTI-SWITCHING METHOD THEREOF

(71) Applicants: Inventec (Pudong) Technology Corporation, Shanghai (CN); INVENTEC CORPORATION, Taipei (TW)

(72) Inventor: Chia-Hsiang Chen, Taipei (TW)

(73) Assignees: INVENTEC (PUDONG) TECHNOLOGY CORPORATION, Shanghai (CN); INVENTEC CORPORATION, Taipei (TW)

(*) Notice: Subject to any disclaimer, the term of this patent is extended or adjusted under 35 U.S.C. 154(b) by 477 days.

(21) Appl. No.: 14/243,633

(22) Filed: Apr. 2, 2014

(65) Prior Publication Data

US 2014/0354078 A1     Dec. 4, 2014

(30) Foreign Application Priority Data

May 31, 2013  (CN) .......................... 2013 1 0213518

(51) Int. Cl.
*H04L 12/931*     (2013.01)
(52) U.S. Cl.
CPC .............. *H04L 49/00* (2013.01); *Y10T 307/76* (2015.04)

(58) Field of Classification Search
CPC ........ H04L 49/00; H02J 4/00; G05B 19/042; G05B 19/10; G05B 19/102; G05B 19/106
See application file for complete search history.

(56) References Cited

U.S. PATENT DOCUMENTS 8,909,038 B2 * 12/2014 Cannon ................ H04B 10/296
                                                  398/6
2009/0100287 A1 * 4/2009 Chu ..................... G06F 11/0769
                                                  714/2

* cited by examiner

*Primary Examiner* — Jeffrey Shin
(74) *Attorney, Agent, or Firm* — Maschoff Brennan

(57) ABSTRACT

A multi-switching device and a multi-switching method thereof perform the following steps. A first control signal and a second control signal are received. Whether the first control signal and the second control signal are received is determined. When the first control signal and the second control signal are received, whether the first control signal and the second control signal specify any control requests is determined. When the first control signal and the second control signal respectively specify a control request, a control signal protection procedure is performed to control a first bus to communicate with one of second buses, and an error warning signal is outputted. When the first control signal and the second control signal do not respectively specify any control requests, a backup processing procedure is performed, and the error warning signal is outputted.

10 Claims, 4 Drawing Sheets

MULTI-SWITCHING DEVICE AND MULTI-SWITCHING METHOD THEREOF

CROSS-REFERENCE TO RELATED APPLICATIONS

This non-provisional application claims priority under 35 U.S.C. §119(a) on Patent Application No(s). 201310213518.9 filed in China on May 31, 2013, the entire contents of which are hereby incorporated by reference.

BACKGROUND OF THE INVENTION

1. Technical Field of the Invention

The disclosure relates to a multi-switching device and a multi-switching method thereof, more particularly to a multi-switching device and a multi-switching method thereof capable of automatically determining and selecting one of the control signals to be an output.

2. Description of the Related Art

Inter-Integrated Circuit (I2C) protocol is a standard widely used in the communication between electronic components. Each electronic component with I2C protocol has its own address which allows a master reading and setting internal data within the electronic component. Generally, a multiplexer (MUX) disposed in a system having many control circuits with the I2C protocol is configured to receive data signals and clock signals and then select one signal path between the master and one electronic component according to a control signal, so that the master can control or read data from the selected electronic device with the I2C protocol.

In a large-scale system, there may be many masters, so that its circuit structure with the I2C protocol may be a masters-to-slave type. For example, a south-bridge chip (SB Chip) and a baseboard management controller (BMC) are configured to control the same control circuit with the I2C protocol. However, most electronic devices with the I2C protocol do not support such a circuit structure having more than one master. Therefore, when two masters control the same control circuit with the I2C protocol simultaneously, errors may occur in the system.

To solve such a problem, a series resistor was disposed on the signal path of each master for signal selection, thereby prioritizing the signal paths according to real requirements. Once the priorities were defined, idle signal paths would be cut off via these series resistors. Even though such a solution could keep the circuit structure with the I2C protocol away from the errors, the design and debugging to the system might lose its flexibility.

SUMMARY OF THE INVENTION

A multi-switching method according to an embodiment of the disclosure includes the following steps. A first control signal and a second control signal are received. Whether or not the first control signal and the second control signal are received is determined. When the first control signal and the second control signal are received, whether the first control signal and the second control signal specify any control requests is determined. When the first control signal and the second control signal respectively specify a control request, a control signal protection procedure is performed to control a first bus to communicate with one of a plurality of second buses, and an error warning signal is outputted. When the first control signal and the second control signal do not respectively specify any control requests, a backup processing procedure is performed, and the error warning signal is outputted.

In an embodiment of the disclosure, the multi-switching method further includes the following steps. When the first control signal and the second control signal are not received, the first control signal and the second control signal are respectively outputted. The first bus is controlled to communicate with one of the second buses according to the first control signal and the second control signal respectively.

In an embodiment of the disclosure, the multi-switching method further includes recording the first control signal and the second control signal.

In an embodiment of the disclosure, the control request meets an internal integrated circuit protocol or a serial peripheral interface bus protocol.

In an embodiment of the disclosure, the control signal protection procedure includes the following steps. Whether or not the first control signal or the second control signal is selected according to a priority list is determined. When the first control signal or the second control signal is selected according to the priority list, the selected the first control signal or the second control signal is outputted according a setting of the priority list. When the first control signal or the second control signal is not selected according to the priority list, preset the first control signal or the second control signal is outputted.

A multi-switching device according to an embodiment of the disclosure includes a control unit and a switch unit. The control unit includes a switch signal monitoring unit, a control signal protection unit, a backup processing procedure unit, an error signal warning unit and a recording unit. The switch signal monitoring unit is configured to receive a first control signal and a second control signal to determine whether the first control signal and the second control signal are received. When the first control signal and the second control signal are received, the switch signal monitoring unit determines whether the first control signal and the second control signal specify any control requests. The control signal protection unit coupled to the switch signal monitoring unit is configured to perform a control signal protection procedure when the first control signal and the second control signal respectively specify a control request, so as to control the switch signal monitoring unit to correspondingly output an error warning signal and the first control signal or the second control signal. The backup processing procedure unit, coupled to the switch signal monitoring unit, is configured to perform a backup processing procedure and output the error warning signal when the first control signal and the second control signal do not respectively specify any control requests. The error signal warning unit coupled to the control signal protection unit and the backup processing procedure unit is configured to receive the error warning signal to generate an error warning message. The switch unit coupled to the control unit includes a first bus and a plurality of second buses. The switch unit according to the first control signal or the second control signal outputted by the switch signal monitoring unit, controls the first bus to communicate with one of the second buses.

In an embodiment, when the first control signal and the second control signal are not received, the switch signal monitoring unit respectively outputs the first control signal and the second control signal. The switch unit controls the first bus to communicate with one of the second buses according to the first control signal and the second control signal respectively.

In an embodiment, the control unit further includes a recording unit. The recording unit coupled to the switch signal monitoring unit is configured to record the first control signal and the second control signal.

In an embodiment, when the control signal protection unit performs the control signal protection procedure, the control signal protection unit determines whether or not the first control signal or the second control signal is selected according to a priority list. When the first control signal or the second control signal is outputted according to the priority list, the control signal protection unit controls the switch signal monitoring unit to output the selected the first control signal or the second control signal, according to a setting in the priority list. When the first control signal or the second control signal is not outputted according to the priority list, the control signal protection unit controls the switch signal monitoring unit to output preset the first control signal or the second control signal.

In an embodiment, the switch unit is a multiplexer, and the control unit is a complex programmable logic device.

BRIEF DESCRIPTION OF THE DRAWINGS

The present disclosure will become more fully understood from the detailed description given herein below for illustration only and thus does not limit the present disclosure, wherein.

DETAILED DESCRIPTION

Figure 1:
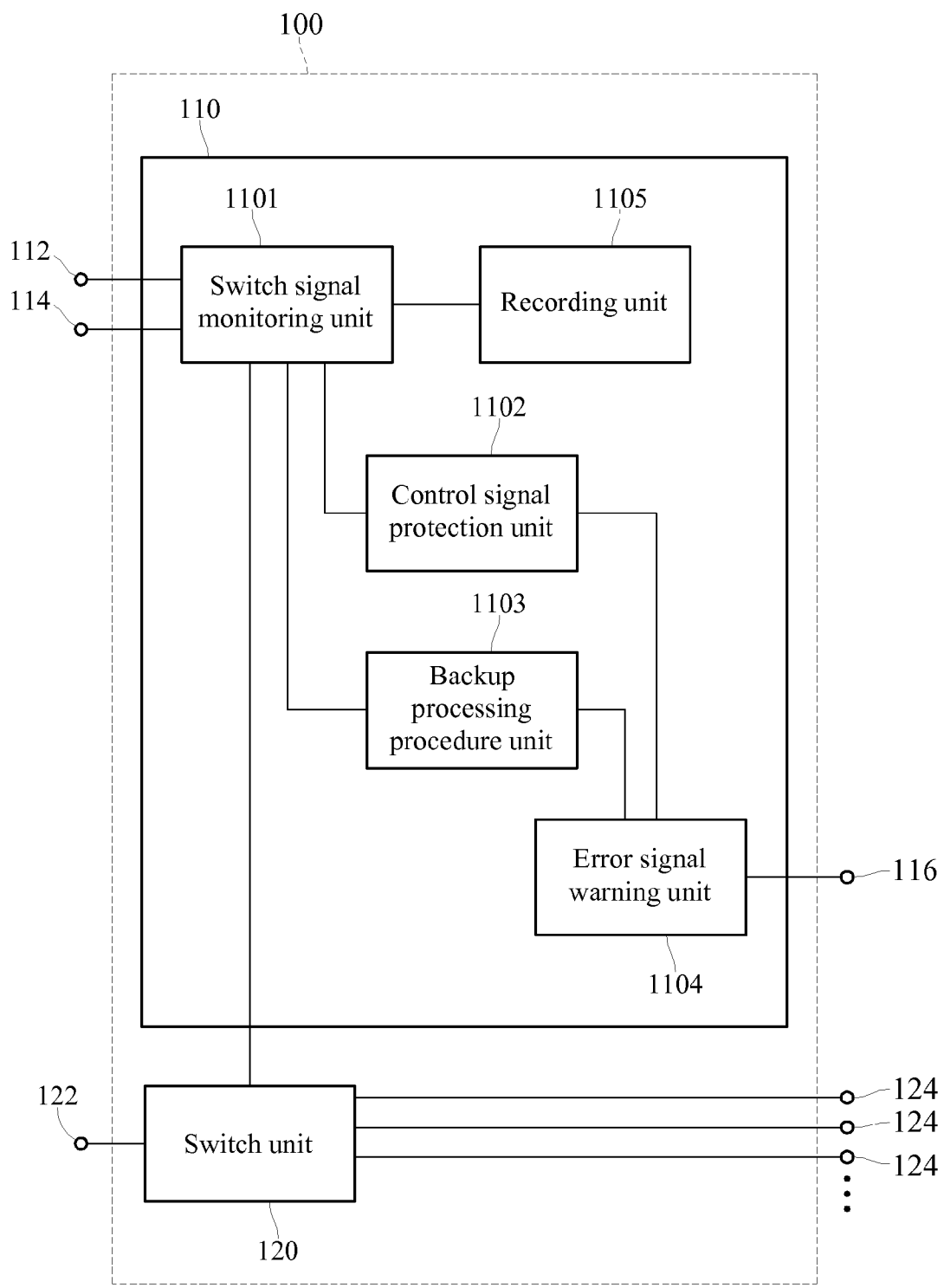
FIG. 1 is a schematic diagram of a multi-switching device in the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

FIG. 1 is a schematic diagram of a multi-switching device in the disclosure. A multi-switching device 100 is applicable to a computer device or server, and is configured to switch control signals outputted by main control components in the computer device or server.

A multi-switching device 100 includes a control unit 110 and a switch unit 120. The control unit 110 includes a switch signal monitoring unit 1101, a control signal protection unit 1102, a backup processing procedure unit 1103, an error signal warning unit 1104 and a recording unit 1105.

The switch signal monitoring unit 1101 is configured to receive a first control signal 112 and a second control signal 114, so as to determine whether the first control signal 112 and the second control signal 114 are received. When the first control signal 112 and the second control signal 114 are received, the switch signal monitoring unit 1101 further determines whether the first control signal 112 and the second control signal 114 specify any control requests. In this and some embodiments, the control request meets an internal integrated circuit protocol or a serial peripheral interface bus (SPI Bus) protocol.

The control signal protection unit 1102, coupled to the switch signal monitoring unit 1101, is configured to perform a control signal protection procedure to control the switch signal monitoring unit 1101 to correspondingly output either the first control signal 112 or the second control signal 114 and output an error warning signal when the first control signal 112 and the second control signal 114 respectively specify their control request.

The backup processing procedure unit 1103, coupled to the switch signal monitoring unit 1101, is configured to perform a backup processing procedure and output the error warning signal when the first control signal 112 and the second control signal 114 do not specify any control requests. The error signal warning unit 1104, coupled to the control signal protection unit 1102 and the backup processing procedure unit 1103 is configured to receive the error warning signal to generate an error warning message 116.

In this and some embodiments, the backup processing procedure means that the backup processing procedure unit 1103 passes a control priority on to a backup control unit from the control unit 110, so as to replace the control function of the control unit 110 by that of the backup control unit, but the disclosure will not be limited thereto.

The switch unit 120, coupled to the control unit 110, includes a first bus 122 and many second buses 124. The switch unit 120 is configured to control the first bus 122 to connect to or communicate with one of the second buses 124 according to the first control signal 112 or the second control signal 114 outputted by the control unit 110. In other words, the first bus 122 connects to one of the second buses 124 according to the first control signal 112, and connects to another one of the second buses 124 according to the second control signal 114. For example, the switch unit 120 is a multiplexer, and the control unit 110 is a complex programmable logic device (CPLD).

In this and some embodiments, the first control signal 112 and the second control signal 114 are outputted by main control components in a computer device or server. For instance, the main control components include a south bridge chip and a baseboard management controller (BMC). In this case, the first control signal 112 is outputted by a south bridge chip, and the second control signal 114 is outputted by a BMC, but the disclosure will not be limited thereto. The detailed operation of the multi-switching device 100 will be described as follows.

Figure 2:
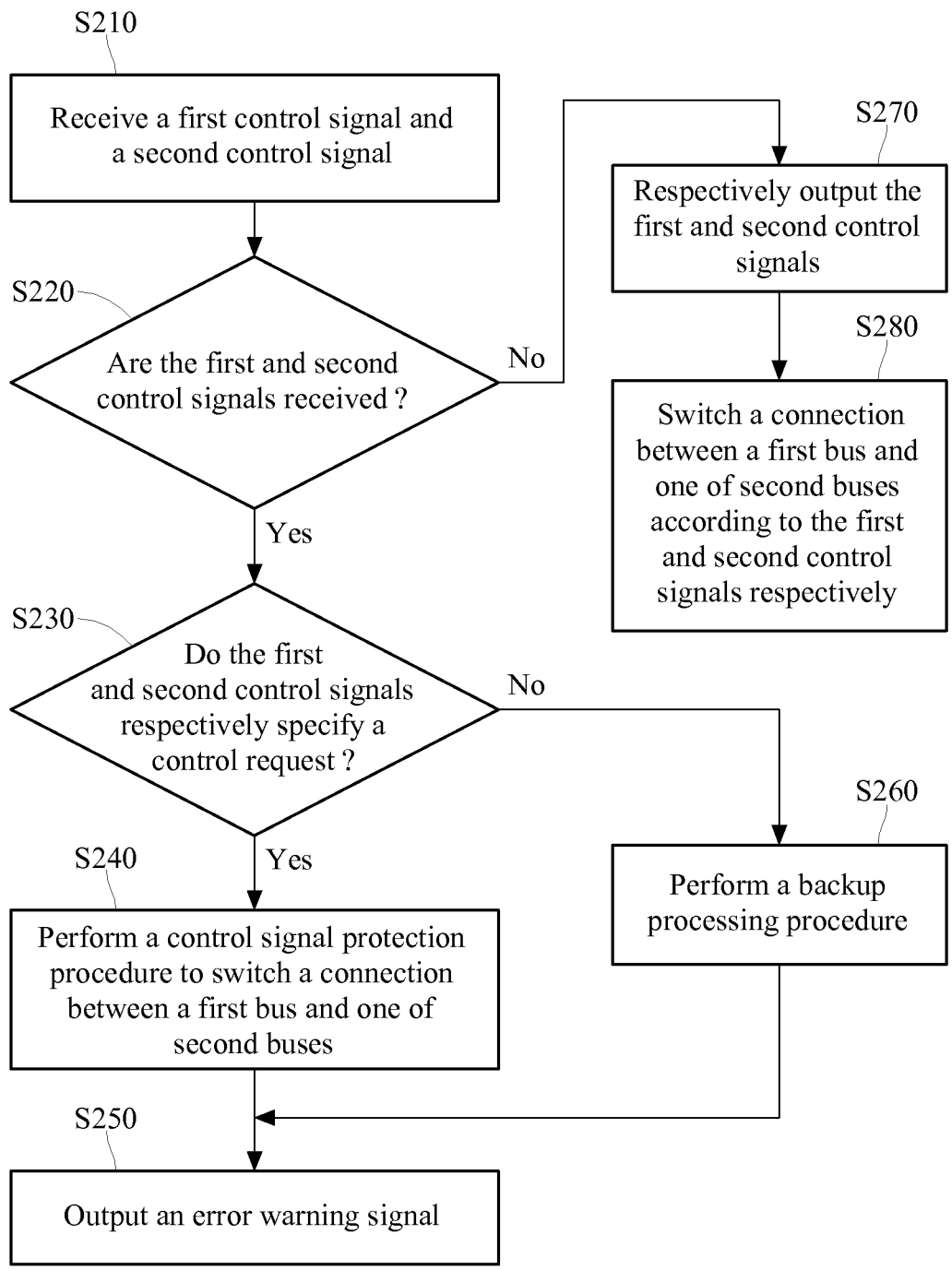
FIG. 2 is a flowchart of a multi-switching method according to an embodiment of the disclosure.

FIG. 2 is a flowchart of a multi-switching method according to an embodiment of the disclosure. Firstly, the switch signal monitoring unit 1101 receives the first control signal 112 and the second control signal 114 (step S210). The switch signal monitoring unit 1101 determines whether the first control signal 112 and the second control signal 114 are received (step S220). For example, the switch signal monitoring unit 1101 determines whether the first control signal 112 and the second control signal 114 are received simultaneously or not. When the first control signal 112 and the second control signal 114 are received, the switch signal monitoring unit 1101 further determines whether the first control signal 112 and the second control signal 114 specify any control requests (step S230).

When the first control signal 112 and the second control signal 114 respectively specify a control request, the control signal protection unit 1102 performs a control signal protection procedure to control the switch signal monitoring unit 1101 to correspondingly output one of the first control signal 112 and the second control signal 114. Accordingly, the control signal protection unit 1102 controls the first bus 122 to communicate with one of the second buses 124 according to one of the first control signal 112 and the second control signal 114 outputted by the switch signal monitoring unit 1101 (step S240). The control signal protection unit 1102 outputs an error warning signal to the error signal warning unit 1104 (step S250).

In contrast, when the first control signal 112 and the second control signal 114 do not respectively specify any control requests, the backup processing procedure unit 1103 performs a backup processing procedure (step S260). Then, the control signal protection unit 1102 also outputs the error warning signal to the error signal warning unit 1104 (step S250). The error signal warning unit 1104 generates an error warning message 116 according to the error warning signal. The error warning message 116 can be presented on, for example, a display device.

As continued from step S220, when the first control signal 112 and the second control signal 114 are not received, the switch signal monitoring unit 1101 respectively outputs the first control signal 112 and the second control signal 114 (step S270). Subsequently, the switch unit 120 controls the first bus 122 to communicate with one of the second buses 124 according to the first control signal 112 and the second control signal 114 respectively (step S280).

For example, when the first control signal 112 is received earlier than the second control signal 114, the switch signal monitoring unit 1101 firstly outputs the first control signal 112 to control the switch unit 120, so that the first bus 122 will communicate with a first one of the second buses 124. Subsequently, the switch signal monitoring unit 1101 outputs the second control signal 114 to the switch unit 120, so that the first bus 122 is switched to communicate with a third one of the second buses 124.

Figure 3:
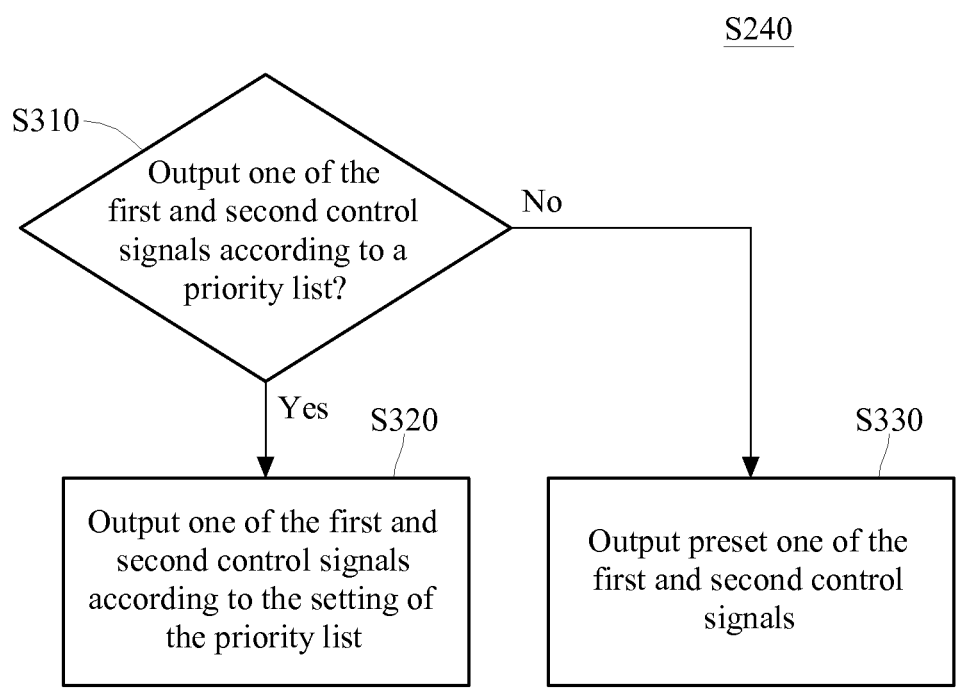
FIG. 3 is a flowchart of step S240 in FIG. 2.

FIG. 3 is a flowchart of step S240 in FIG. 2. When the control signal protection unit 1102 performs the control signal protection procedure, the control signal protection unit 1102 firstly determines whether the first control signal 112 or the second control signal 114 is selected as an output according to a priority list (step S310). When either the first control signal 112 or the second control signal 114 is selected according to the priority list, the control signal protection unit 1102 controls the switch signal monitoring unit 1101 to output one of the first control signal 112 and the second control signal 114 according to the setting in the priority list (step S320).

In this and some embodiments, the priority list is preset according to the importance of the first control signal 112 and the second control signal 114. Assume that the first control signal 112 has a higher priority than the second control signal 114. When the switch signal monitoring unit 1101 receives the first control signal 112 and the second control signal 114, the control signal protection unit 1102 controls the switch signal monitoring unit 1101 to output the first control signal 112 to the switch unit 120. In contrast, assume that the second control signal 114 has a higher priority than the first control signal 112. When the switch signal monitoring unit 1101 receives the first control signal 112 and the second control signal 114, the control signal protection unit 1102 will control the switch signal monitoring unit 1101 to output the second control signal 114 to the switch unit 120.

When one of the first control signal 112 and the second control signal 114 is selected according to the priority list, the control signal protection unit 1102 controls the switch signal monitoring unit 1101 to output preset one of the first control signal 112 and the second control signal 114 to the switch unit 120 (step S330). Assume that the first control signal 112 has a higher priority than the second control signal 114, but the disclosure will not be limited thereto. When the first control signal 112 or the second control signal 114 is received, the control signal protection unit 1102 will control the switch signal monitoring unit 1101 to output the first control signal 112 to the switch unit 120 according to the setting of the priority list.

Figure 4:
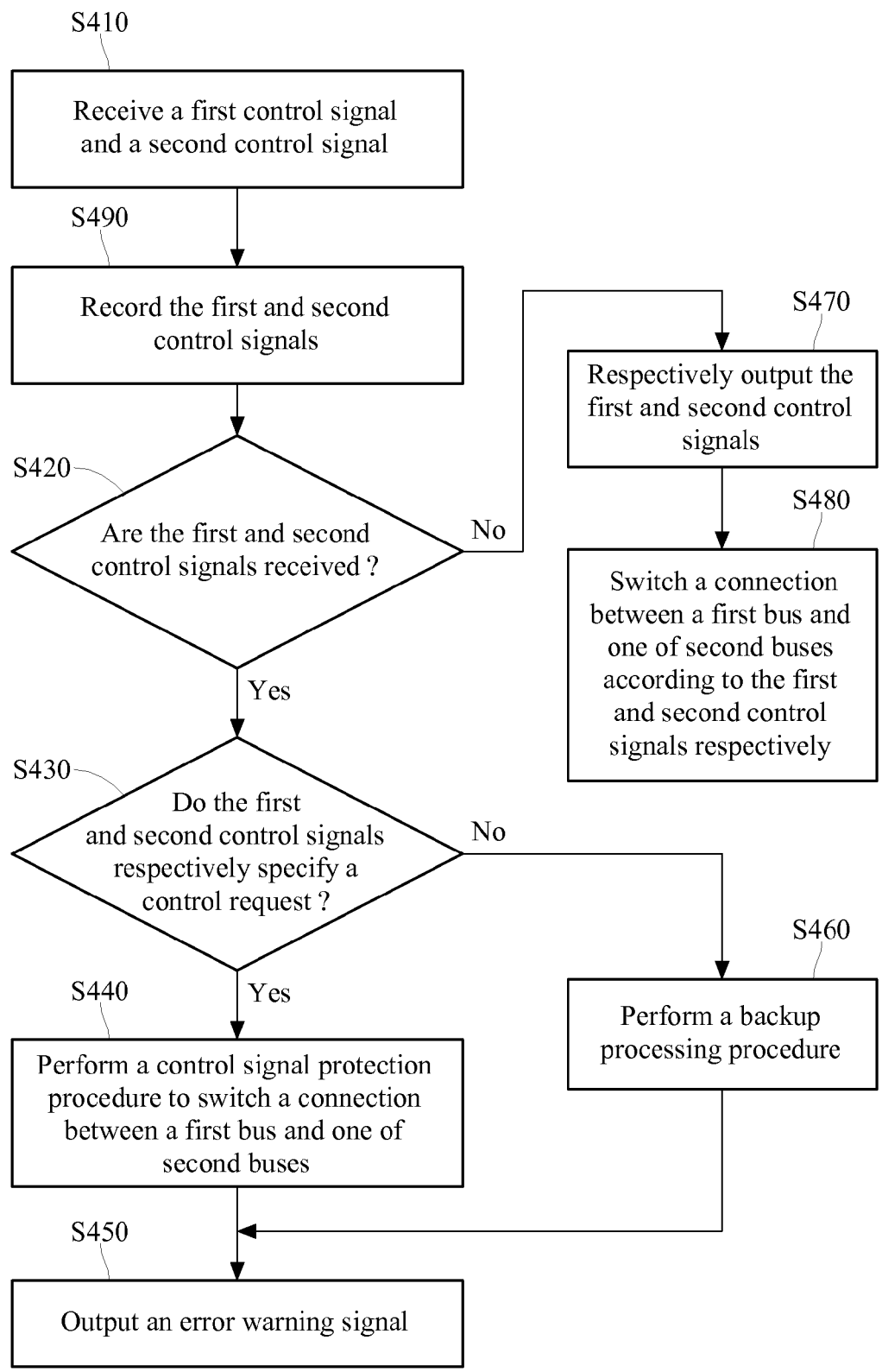
FIG. 4 is a flowchart of a multi-switching method according to another embodiment of the disclosure.

FIG. 4 is a flowchart of a multi-switching method according to another embodiment of the disclosure. Firstly, the switch signal monitoring unit 1101 receives the first control signal 112 and the second control signal 114 (step S410). The recording unit 1105 records the received first control signal 112 and the received second control signal 114 (step S490) in order to avoid data leakage. Then, the switch signal monitoring unit 1101 determines whether the first control signal 112 and the second control signal 114 are received (step S420).

When the first control signal 112 and the second control signal 114 are received, the switch signal monitoring unit 1101 further determines whether the first control signal 112 and the second control signal 114 specify any control requests (step S430). When the first control signal 112 and the second control signal 114 respectively specify a control request, the control signal protection unit 1102 performs the control signal protection procedure to control the first bus 122 to communicate with one of the second buses 124 (step S440). Then, the control signal protection unit 1102 outputs an error warning signal to the error signal warning unit 1104 (step S450).

On the other hand, when the first control signal 112 and the second control signal 114 do not respectively specify any control requests, the backup processing procedure unit 1103 performs the backup processing procedure (step S460). Then, the control signal protection unit 1102 outputs an error warning signal to the error signal warning unit 1104 (step S450).

As continued from step S420, when the first control signal 112 and the second control signal 114 are not received, the switch signal monitoring unit 1101 respectively outputs the first control signal 112 and the second control signal 114 (step S470). Then, the switch unit 120 controls the first bus 122 to communicate with one of the second buses 124 according to the first control signal 112 and the second control signal 114 respectively (step S480).

In the multi-switching device and the multi-switching method thereof in the disclosure, whether the first control signal and the second control signal specify any control requests is determined after the first control signal and the second control signal are received, whereby the control signal protection procedure or the backup processing procedure is performed to output an error warning signal and control the switch unit to control the first bus to communicate with one of the second buses. In this way, the disclosure may automatically determine and select a suitable control signal to switch the signal paths, so as to avoid the conflict between the control priorities of many main control components such as the SB chip and the BMC.

What is claimed is:
1. A multi-switching method, comprising:
   receiving a first control signal and a second control signal;
   determining whether the first control signal and the second control signal are received;
   when the first control signal and the second control signal are received, determining whether the first control signal and the second control signal specify any control requests;
   when the first control signal and the second control signal respectively specify a control request, performing a control signal protection procedure to control a first bus to communicate with one of a plurality of second buses, and output an error warning signal; and when the first control signal and the second control signal do not specify any control requests, performing a backup processing procedure and outputting the error warning signal.

2. The multi-switching method according to claim 1, further comprising:

when the first control signal and the second control signal are not received, outputting the first control signal and the second control signal respectively; and according to the first control signal and the second control signal, respectively controlling the first bus to communicate with one of the second buses.

3. The multi-switching method according to claim 1, further comprising:

recording the first control signal and the second control signal.

4. The multi-switching method according to claim 1, wherein the control request meets an internal integrated circuit protocol or a serial peripheral interface bus protocol.

5. The multi-switching method according to claim 1, wherein the control signal protection procedure comprises:

determining whether the first control signal or the second control signal is selected to be outputted according to a priority list;

when the first control signal or the second control signal is outputted according to the priority list, outputting the first control signal or the second control signal according to a setting in the priority list; and when the first control signal or the second control signal is not outputted according to the priority list, outputting preset the first control signal or the second control signal.

6. A multi-switching device, comprising:

a control unit, comprising:

a switch signal monitoring unit configured to receive a first control signal and a second control signal, so as to determine whether the first control signal and the second control signal are received, and to determine whether the first control signal and the second control signal specify any control requests, when the first control signal and the second control signal are received;

a control signal protection unit coupled to the switch signal monitoring unit, and configured to perform a control signal protection procedure when the first control signal and the second control signal respectively specify a control request, so as to control the switch signal monitoring unit to correspondingly output the first control signal or the second control signal and output an error warning signal;

a backup processing procedure unit coupled to the switch signal monitoring unit and configured to, when the first control signal and the second control signal do not specify any control requests, performing a backup processing procedure and outputting the error warning signal; and an error signal warning unit coupled to the control signal protection unit and the backup processing procedure unit and configured to receive the error warning signal to generate an error warning message; and a switch unit coupled to the control unit, the switch unit comprising a first bus and a plurality of second buses, and the switch unit switching the first bus to communicate with one of the second buses according to the first control signal or the second control signal outputted by the switch signal monitoring unit.

7. The multi-switching device according to claim 6, wherein when the first control signal and the second control signal are not received, the switch signal monitoring unit respectively outputs the first control signal and the second control signal, and the switch unit controls the first bus to communicate with one of the second buses respectively according to the first control signal and second control signal.

8. The multi-switching device according to claim 6, wherein the control unit further comprises:

a recording unit coupled to the switch signal monitoring unit and configured to record the first control signal and the second control signal.

9. The multi-switching device according to claim 6, wherein when the control signal protection unit performs the control signal protection procedure, the control signal protection unit determines whether the first control signal or the second control signal is selected to be outputted according to a priority list; when the first control signal or the second control signal is outputted according to the priority list, the control signal protection unit controls the switch signal monitoring unit to output the first control signal or the second control signal according to a setting in the priority list; when the first control signal or the second control signal is not outputted according to the priority list, the control signal protection unit controls the switch signal monitoring unit to output preset the first control signal or the second control signal.

10. The multi-switching device according to claim 6, wherein the switch unit is a multiplexer, and the control unit is a complex programmable logic device.

* * * * *